United States Patent [19]

Gomberg et al.

[11] Patent Number: 5,110,629
[45] Date of Patent: May 5, 1992

[54] METHOD FOR PREPARING RUBBER SURFACE FOR ADHESION TO POLYMERIC FORMULATION

[75] Inventors: Edward N. Gomberg, Las Vegas, Nev.; Ahmed A. Zurkiya, Hixson, Tenn.

[73] Assignee: Synair Corporation, Chattanooga, Tenn.

[21] Appl. No.: 593,199

[22] Filed: Oct. 5, 1990

[51] Int. Cl.$^5$ ............................................... B05D 3/02
[52] U.S. Cl. ................................ 427/322; 156/331.7; 427/393.5; 427/412.1; 428/423.9
[58] Field of Search ............ 427/412.1, 393.5, 322; 428/423.9; 156/331.7

[56] References Cited

U.S. PATENT DOCUMENTS 4,265,973  5/1981  Schuurink et al. ............... 427/393.5

Primary Examiner—Michael Lusignan
Attorney, Agent, or Firm—Lyon & Lyon

[57] ABSTRACT

A heat stable bond between uncured urethane formulations and a rubber or synthetic rubber substrate is obtained by a method comprising coating the rubber surface with first a polyamine solution, then a peroxide solution and then a polyisocyanate-terminated monomer or prepolymer before applying the uncured urethane. While previously used bonds employing cyanoacrylate ester adhesives lose bond strength at elevated temperatures, the bond achieved in the present invention is stable throughout the operating temperature of the urethane.

18 Claims, No Drawings

METHOD FOR PREPARING RUBBER SURFACE FOR ADHESION TO POLYMERIC FORMULATION

FIELD OF THE INVENTION

The present invention relates to a method of preparing the surface of substrates, and particularly of rubber and synthetic rubber substrates, for adhesion of urethane formulations.

BACKGROUND OF THE INVENTION

Butyl rubber is used in producing pneumatic tire casings because its impermeability to air and other gases prevents the loss of compressed air by diffusion. The practice of lining the interior of tires with a sealant material so as to reduce the deflation of the tire when punctured is well known. A method for lining a tire with such a sealant is disclosed in U.S. Pat. No. 4,418,093. A particularly successful type of tire lining is a tacky, self-healing elastomer such as urethane. When a lined pneumatic tire is penetrated by a sharp object, the elastomer bonds to the surface of the object and thereby closes off any opening through which the pressurized air in the casing can escape. When the object is withdrawn, the tacky walls of the elastomers close upon themselves and fuse, again preventing the escape of the compressed air in the tire.

The desirability of achieving maximum bonding strength between urethane formulations and cured rubber or synthetic rubber substrates has long been known in the art. The pull strength of a urethane-to-rubber bond should be equal to that of rubber-to-rubber or urethane-to-urethane bonds. A desirable bond strength should be equal to the tear strength of the weakest of the two substrates or adherends, and preferably 80 pounds per linear inch (pli). U.S. Pat. No. 4,240,852 assigned to Synair Corporation describes a method of bonding urethane formulations to rubber using primers or adhesive agents, such as α-cyanoacrylate ethyl ester. In that method, the rubber or synthetic rubber substrate is cleaned and then coated with a liquid adhesive. Before the adhesive has a chance to dry, the substrate surface is coated with a liquid or paste urethane formulation and then allowed to cure. Following the procedure outlined above, it is possible to obtain bond strengths in excess of 80 pli.

A potential concern with the method for bonding urethane to butyl rubber using cyanoacrylate adhesives is their heat instability. Cyanoacrylate adhesives lose bond strength at elevated temperatures, which could limit their use in tires operating in zones of elevated temperature. The temperature inside truck tires operating at high speed on long hauls with full loads can reach 280 degrees Fahrenheit. The object of the present invention is directed to a method of preparing the rubber substrate for adhesion to urethane such that the adhesive does not lose its bond strength at elevated temperatures.

SUMMARY OF THE INVENTION

We have found in the present invention that, when the rubber surface is treated with three materials in the order specified and then coated with liquid or paste urethane, the resulting bond will retain its integrity over the operating temperature range of the urethane.

The tire casings can be made of any suitable material, such as rubber, synthetic rubber and various polymeric materials. The casings may be belted or reinforced with materials such as steel and natural and synthetic fibers. The tire liner or sealant can be any non-flowing sealant material. A particularly suitable material is a self-healing polyurethane elastomeric material. The preferred elastomeric urethane material is TYRLINER, marketed by Synair Corporation, 2003 Amnicola Highway, Chattanooga, Tenn. 37406. However, formulations of urethane materials which can be used in the practice of the present invention can be readily produced by persons skilled in the art from known chemistry techniques in the production of urethanes.

Although the present invention is particularly directed to an adhesive for a tire liner, other important uses include repairing tears or worn spots in rubber-based articles, patching tires which have been torn or ripped, and recapping tires. The ability of the user to build on a rubber or synthetic rubber substrate with a cold-curing system that has good adhesion offers a wide range of cost-saving industrial applications.

In the invention, the rubber or synthetic rubber substrate is treated consecutively with three solutions or materials: A, B and C. Solution A is composed of a polyamine dissolved in a suitable aqueous or organic solvent. A suitable solvent is one which freely dissolves the solute and evaporates in a reasonable time. Examples of the active ingredient in Solution A include, but are not limited to: m-phenylene diamine, p-phenylene diamine, ethylene diamine, 3,5-diaminochlorobenzene, methylenedianiline, toluene-2,4-diamine, diethyltoluene diamine, and blends of polyamines. Solution A is sprayed or brushed on to the surface of the rubber substrate in an amount sufficient to cover the entire surface. The solvent in Solution A is then allowed to evaporate before applying Solution B.

Solution B is a peroxide dissolved in a suitable aqueous or organic solvent. Examples of suitable peroxides include, but are not limited to: hydrogen peroxide, di-tertiarybutyl peroxide, dicumyl peroxide, benzoyl peroxide, and methyl ethyl ketone peroxide. The solvent in Solution B is allowed to evaporate before applying Solution C.

Solution C is a polyisocyanate-terminated monomer or prepolymer applied neat or dissolved in a suitable aqueous or organic solvent. Examples of the active ingredient in Solution C include, but are not limited to: toluene diisocyanate (all isomers), methylene diisocyanate, commercially available 15 polymeric isocyanates, aliphatic polyisocyanates, and polyurethane prepolymers and quasiprepolymers.

Once Solution C has been applied, the surface is immediately coated with an uncured liquid or paste urethane formulation. As the urethane cures to its ultimate hardness, it forms a bond with the treated surface which will retain its integrity as temperature is increased. Polymers other than urethane which can react with the isocyanate-rich surface to form chemical bonds can also be bonded to the prepared surface using this method.

All bonded material prepared using the present invention maintained its bond strength at elevated temperatures. The bond appeared to become stronger at these higher temperatures. It was not possible to determine peel (bond) strength since, in every test from 100 to 293 degrees Fahrenheit self-healing urethane to butyl rubber, cohesive failure occurred. In cohesive failure, the bond remains intact with a thin layer of urethane adhered to the rubber surface; the tear occurred within the urethane.

EXAMPLE

Butyl rubber samples were first cleaned by either abrading the surface or scrubbing with wire brush and detergent solution, rinsed with water and dried. The clean, dry surface was then coated with Solution A: 4% m-phenylene diamine, 12% isopropanol, and 84% water. The surface was then dried with hot air. Next, the surface was coated with Solution B: 10% hydrogen peroxide and 90% water. Then, the surface was coated with Solution C: 100% Mondur MRS-2. After allowing the solutions on the surface to react, a mixture of liquid urethane was applied and allowed to cur for four to eight hours. (Overnight curing is preferred.)

The samples were then evaluated using T-Peel Adhesion Test. First, the low-hardness urethane samples were tested. At ambient temperature, cohesive failure occurred with a peel strength measured as 4.5–5.5 pli. Even at a low temperature, the bond of urethane to butyl rubber is stronger than the low-hardness urethane. When the sample was heated at 293° F. for 4 hours and subjected to the peel test while still hot, cohesive failure again occurred, with a measured peel strength of 2.5–3.5 pli. As a control, low-hardness urethane was applied to a butyl rubber substrate which had not first been treated with Solutions A, B and C. When the peel test was performed on this sample at ambient temperature, adhesive failure occurred——meaning the low-hardness urethane peeled off the butyl rubber without leaving a layer of urethane attached. The peel strength was measured at 1–1.5 pli.

Next, the medium-hardness urethane samples were tested. At ambient temperature, cohesive failure occurred with a peel strength of 15–17 pli. A sample heated to 275° F. for four hours also suffered cohesive failure when tested hot, with a measured peel strength of 10–12 pli. A control sample, medium-hardness urethane was applied to butyl rubber which had not first been treated with Solutions A, B and C. Adhesive failure occurred at ambient temperature with a peel strength of 1–2 pli.

As is apparent from the foregoing specification, the present invention is capable of being embodied with various alterations and modifications from those described above. For this reason, it is to be fully understood that all of the foregoing is intended to be merely illustrative and is not intended to limit, in any manner, the scope of the invention as set forth in the following claims.

We claim:

1. A method of preparing a surface of a rubber substrate for forming a temperature stable bond to polymeric formulations including the sequential steps of:
   applying a coat of a polyamine, Solution A, to a rubber substrate;
   applying a coat of a peroxide solution, Solution B;
   applying a coat of a polyisocyanate, Solution C, wherein the surface becomes isocyanate-rich; and
   applying a polymeric formulation whereafter the polymeric formulation is allowed to cure, thereby chemically bonding to the isocyanate-rich surface.

2. The method of claim 1 in which the polymeric formulation is urethane.

3. The method of claim 1 in which the Solutions A, B and C are composed of solutes dissolved in suitable solvents.

4. The method of claim 3 in which Solutions A, B and C are sprayed onto the rubber surface.

5. The method of claim 1 in which the polyamine, Solution A, is m-phenylene diamine.

6. The method of claim 1 in which the peroxide, Solution B, is di-tertiary-butyl peroxide.

7. The method of claim 1 in which the peroxide, Solution B, is hydrogen peroxide.

8. The method of claim 1 in which the polyisocyanate, Solution C, is toluene diisocyanate.

9. The method of claim 1 in which the polyhisocyanate, Solution C, is a polymeric isocyanate.

10. The method of claim 1 in which the polymeric formulation is cured at room temperature.

11. The method of claim 1 in which the polymeric formulation is heat cured.

12. The method of claim 1 in which the rubber substrate comprises a synthetic rubber.

13. The method of claim 1 in which the polyisocyanate, Solution C, is a polyisocyanate-terminated monomer.

14. The method of claim 1 in which the polyisocyanate, Solution C, is a polyisocyanate-terminated prepolymer.

15. The method of claim 1 in which the polymeric formulation is a liquid.

16. The method of claim 1 in which the polymeric formulation is a paste.

17. The method of claim 3 in which Solutions A, B and C are brushed onto the rubber surface.

18. The method of claim 3 in which Solutions A, B and C are threaded onto the rubber surface.

* * * * *